United States Patent
Naydenov

(10) Patent No.: US 12,071,594 B2
(45) Date of Patent: Aug. 27, 2024

(54) TALL DIESEL COMPOSITION

(71) Applicant: SUNPINE AB, Piteå (SE)

(72) Inventor: Valeri Naydenov, Luleå (SE)

(73) Assignee: SUNPINE AB, Piteå (SE)

(*) Notice: Subject to any disclaimer, the term of this patent is extended or adjusted under 35 U.S.C. 154(b) by 0 days.

(21) Appl. No.: 18/015,342

(22) PCT Filed: Jul. 9, 2021

(86) PCT No.: PCT/SE2021/050706
§ 371 (c)(1),
(2) Date: Jan. 10, 2023

(87) PCT Pub. No.: WO2022/015223
PCT Pub. Date: Jan. 20, 2022

(65) Prior Publication Data
US 2024/0034948 A1  Feb. 1, 2024

(30) Foreign Application Priority Data
Jul. 15, 2020 (SE) .................................. 2050894-1

(51) Int. Cl.
*C10G 7/04* (2006.01)
*B01D 1/06* (2006.01)
*B01D 3/14* (2006.01)
*C10L 1/02* (2006.01)

(52) U.S. Cl.
CPC .............. *C10L 1/026* (2013.01); *B01D 1/065* (2013.01); *B01D 3/148* (2013.01); *C10G 7/04* (2013.01); *C10L 2200/0446* (2013.01)

(58) Field of Classification Search
CPC .......... B01D 1/065; B01D 3/148; C10G 3/50; C10G 7/04; C10L 1/026; C10L 1/08; C10L 2200/0446; C11B 13/005; Y02E 50/10; Y02P 30/20; Y02W 30/74
See application file for complete search history.

(56) References Cited

U.S. PATENT DOCUMENTS

| | | |
|---|---|---|
| 925,763 A | 6/1909 | Embry |
| 3,019,118 A | 1/1962 | Wallen |
| 3,157,629 A | 11/1964 | Patrick |
| 3,804,819 A | 4/1974 | Wengrow et al. |
| 3,965,085 A | 6/1976 | Holmbom et al. |
| 4,300,009 A | 11/1981 | Haag et al. |
| 4,332,737 A | 6/1982 | Manos |
| 5,705,722 A | 1/1998 | Monnier et al. |
| 6,849,581 B1 | 2/2005 | Thompson et al. |
| 7,374,589 B2 | 5/2008 | Bernasconi et al. |
| 8,471,081 B2 | 6/2013 | McCall |
| 8,816,105 B2 | 8/2014 | Ristolainen et al. |
| 9,133,334 B1 | 9/2015 | Tutin et al. |
| 9,499,767 B2 | 11/2016 | Stigsson et al. |
| 2006/0229222 A1* | 10/2006 | Muller .................. C11C 3/02 510/130 |
| 2007/0049727 A1 | 3/2007 | Pollock et al. |
| 2011/0049012 A1 | 3/2011 | Stigsson et al. |
| 2014/0311018 A1* | 10/2014 | Warnqvist ............... C11C 1/10 44/306 |
| 2018/0312777 A1 | 11/2018 | Wang |
| 2020/0017800 A1 | 1/2020 | Nevanlinna et al. |

FOREIGN PATENT DOCUMENTS

| | | |
|---|---|---|
| CA | 2953254 | 6/2017 |
| EP | 3626807 A1 | 3/2020 |
| FI | 123683 B | 5/2013 |
| GB | 925763 | 5/1963 |
| SE | 520633 C2 | 8/1997 |
| SE | 1351563 A1 | 6/2014 |
| SE | 543463 C2 | 5/2020 |
| WO | WO-0138461 A1 | 5/2001 |
| WO | WO-03052034 A1 | 6/2003 |
| WO | WO-2004/013259 A1 | 2/2004 |
| WO | WO-2007/022169 A1 | 2/2007 |
| WO | WO-2009/131510 A1 | 10/2009 |
| WO | WO-2010/097519 A2 | 9/2010 |
| WO | WO-2010/128208 A2 | 11/2010 |
| WO | WO-2012/069704 A1 | 5/2012 |
| WO | WO-2014/098692 A1 | 6/2014 |
| WO | WO-2014/098763 A1 | 6/2014 |
| WO | WO-2014/161724 A1 | 10/2014 |
| WO | WO-2014/161736 A1 | 10/2014 |
| WO | WO-2020/091651 A1 | 5/2020 |

OTHER PUBLICATIONS

Keskin, "Biodiesel production from tall oil with synthesized Mn and Ni based additives: Effects of the additives on fuel consumption and emissions", vol. 86 (2007)pp. 1139-1143.
Brännström, "Current and Potential Biofuel Production from Plant Oils", BioEnergy Research, vol. 11, (2018) pp. 592-613.
Swedish Search Report for Application No. 2050894-1 mailed Feb. 11, 2021.
Lappi; "Pyrolysis of Crude Tall Oil-Derived Products"; BioResources 6(4), 5121-5138.
Neaves; "Evaluation of Fatty Acid Fraction Derived from Tall Oil as a Feedstock for Biodiesel Production"; Mississippi State University; Scholars Junction; May 5, 2007.
Albuquerque; "Reactive Separation Processes Applied to Biodiesel Production: phase equilibrium, design, optimization and techno-economic assessment"; Federal University of Pernambuco, Center of Technology and Geosciences, Department of Chemical Engeinering, Graduate Program in Chemical Engineering; Approved Feb. 27, 2019.

(Continued)

*Primary Examiner* — Ellen M Mcavoy
*Assistant Examiner* — Chantel Graham
(74) *Attorney, Agent, or Firm* — MOSER TABOADA

(57) ABSTRACT

The present invention describes a tall diesel composition obtainable from a crude tall oil, said tall diesel composition comprising carboxylic acids in a range of 50-98 wt % and neutral components in a range of 2-50 wt %, wherein the tall diesel composition comprises 1-20 wt % rosin acids, 6-35 wt % saturated fatty acids and 59-74 wt % unsaturated fatty acids.

21 Claims, No Drawings

(56) References Cited

OTHER PUBLICATIONS

Lopes; "Analysis of Political, Economical and Technical Aspects of Biodiesel"; Instituto Superior Técnico, Universidade Técnica de Lisboa; Sep. 2007.
Pollock, et al. "Tall Oil Esters as a Source of Biodiesel Fuel".
Kraton; Sylvatal™ 20S Distilled Tall Oil; Product Data Sheet; Dec. 29, 2021.
Kraton; Sylvatal™ 10S Distilled Tall Oil; Product Data Sheet; Dec. 29, 2021.
Kraton; Sylvatal™ 20S Safety Data Sheet; Sep. 21, 2017.
Kraton; Sylvatal™ 10S Safety Data Sheet; Sep. 21, 2017.
Kraton Performance Chemicals EMEA Product Guide.
Ukkonen; Distillability of Extracted Mixed-Birch Tall Oil; Oy Kaukas Ab, SF53200 Lappenranta 20, Finland.
Konwar; Efficient hydrothermal deoxygenation of tall oil fatty acids into n-paraffinic hydrocarbons and alcohols in the presence of aqueous formic acid; Published online Nov. 5, 2020.
Norlin, "all Oil"; Ullmann's Encyclopedia of Industrial Chemistry, © 012 Wiley-VCH Verlag GmbH & Co. KGaA, Weinheim DOI: 10.1002/14356007.a26_057.
Shevchenko; "Fatty Acids of Vegetable Oils as Components of Anti-Wear Diesel-Fuel Additives"; ISSN 1070-4272; Russian Journal of Applied Chemistry, 2019, vol. 92, No. 1, pp. 166-169 © Pleiades Publishing, Ltd., 2019.
Handbook on Tall Oil Rosin Production, Processing and Utilization.
Knothe, et al., "The Biodiesel Handbook", Second Edition, AOCS Press, pp. 1-19.
Haas, "Alternate Feedstocks and Technologies for Biodiesel Production", U.S. Department of Agriculture, Agricultural Research Service, Eastern Regional Research Center, Wyndmoor, PA, pp. 47-65.
Körbitz, "Biodiesel Production in Europe and North America, an Encouraging Prospect", Renewable Energy 16 (1999) pp. 1078-1083.
Holmbom, et al., "Studies on Tall Oil From Pine and Birch", Acta Academiae Aboensis, Ser. B, vol. 31 nr 13, 14 pages.
SunPine Developing Tall Oil Refinery for Production of Biodiesel or Renewable Diesel Feedstock (https://www.greencarcongress.com/2007/12/sunpine-develop.html) Dec. 30, 2007, 6 pages.
McSweeney, et al., "Tall Oil and Its Uses-II", Pulp Chemicals Association, Inc., @1987, ISBNO-9600416-4, 6 pages.

* cited by examiner

TALL DIESEL COMPOSITION

FIELD OF THE INVENTION

The present invention relates to a tall diesel composition.

TECHNICAL BACKGROUND

Different tall diesel compositions and the production thereof have been described. For instance, in WO2009/131510 there is disclosed a method for conversion of crude tall oil into high-quality diesel fuels. The method comprises different steps, such as removal of non-oil contaminants in the crude tall oil (CTO), removal of volatiles, then separation in a vacuum distillation column into two process streams, one with comparatively lower boiling points and another one with comparatively higher boiling points, and then finally lowering the oxygen content in the stream with lower boiling points by decarboxylation and/or decarbonylation. Moreover, in WO2014/098763 there is disclosed a process for refining of crude tall oil (CTO). The process comprises fractionation under vacuum of a refined CTO into at least one stream of refined tall diesel (RTD) or tall oil fatty acids (TOFA), the RTD or TOFA comprises from 2-30% by volume of resin acids and from 20-90% by volume of fatty acids, and at least one stream of resin acid(s) (RA) comprising less than 5% by volume of fatty acids. WO 2014/098763 also relates to a refined tall diesel composition which comprises 1-30 wt. % resin acid(s) (RA) and 70-95 wt. % fatty acid(s) (FA) and which further comprises 1-10 wt. % crude sulphate turpentine(s) (CST) and 0-1 wt. % anthraquinone.

One aim of the present invention is to provide a tall diesel composition which is optimal in terms of further processing, such as when hydrotreating the tall diesel composition over catalyst in presence of hydrogen gas with and/or without fossil component to obtain renewable diesel fuel.

It has to be said that several references are made throughout the description to hydrotreating, hydrodeoxygenation, catalyst, hydrogen gas, important fuel characteristics, etc. however, all these are standard operations/aids within conventional oil refineries. Thus, the references are made to emphasize the impacts on the final diesel fuel in relation to the tall diesel composition according to the present invention.

SUMMARY OF THE INVENTION

The stated purpose above is achieved by a tall diesel composition obtainable from a crude tall oil, said tall diesel composition comprising carboxylic acids in a range of 50-98 wt % and neutral components in a range of 2-50 wt %, wherein the tall diesel composition comprises 1-20 wt % rosin acids, 6-35 wt % saturated fatty acids and 59-74 wt % unsaturated fatty acids.

In SE 520633 there is disclosed a method for the production of an intermediate distillate from a plant oil by hydrogenation and catalytic conversion. On page 5 in SE 520633 there is disclosed the composition content of a tall oil fatty acid composition in table 1. This composition differs from the tall diesel composition according to the present invention.

Furthermore, in "Current and Potential Biofuel Production from Plant Oils" (Brännström, H et al.) in Bioeng. Res. 2018, Vol 11, pp. 592-613 there is disclosed the compositions of different plant oil, e.g. tall oil, and the review comprises information on CTO (crude tall oil) and the fatty acid composition thereof. As is clear from table 3 in the article, the total level of fatty acids, levels of saturated fatty acids and unsaturated fatty acids are not at all at the same level as in accordance with the tall diesel composition according to the present invention. This difference is further clear from page 601 of the article where it is mentioned that CTO comprises 30-50% fatty acids. Furthermore, as it describes a number of advantages when incorporating various other components, the present invention clearly extends beyond and points away from the use of tall oil fatty acids as described in the article "Current and Potential Biofuel Production from Plant Oils".

Moreover, in "Biodiesel production from tall oil with synthesized Mn and Ni based additives: Effects of the additives on fuel consumption and emissions." (Keskin, A et al.) in Fuel 2007, Vol 86, pp. 1139-1143, there is disclosed the production of biodiesel fuel and fuel additives from crude tall oil. Also in this article, the composition of crude tall oil is presented. As mentioned on page 1140 in the article, the raw material used comprises 40-50% resinic acids, 30-40% fatty acids and 10% neutral or unsaponifiable material. This is also clear form table 1 on page 1141. Also in this case, the composition disclosed differs from the tall diesel composition according to the present invention.

The composition according to the present invention has several advantages. One advantage of the composition according to the present invention is that it enables to maximize the yield relative to CTO feedstock, thus increasing the amount of renewable diesel fuel obtained after hydrotreatment step. One further advantage of the composition according to the present invention is that it enables to provide more balanced/extended tall diesel composition by including all relevant tall oil components, which composition after subsequent hydrotreating step yields renewable fuel with boiling point distribution mimicking more closely the fossil counterpart diesel fuel. Yet another advantage after a hydrotreating step of the composition according to the present invention, is that this provides a product with density similar and/or equal to the fossil diesel fuel counterpart. Yet another advantage of the composition according to the present invention is that it enables the incorporation of tall oil components consuming less hydrogen gas during the hydrotreating step thus lowering the overall hydrogen consumption. Yet, another advantage of the tall diesel composition obtained according to the present invention is that it enables the incorporation of tall oil components which provide improved properties e.g. viscosity, lubricity, cold flow, etc. of the diesel fuel obtained after a hydrotreatment step. Combined all the advantages set forth of the tall diesel composition according to the present invention contribute to fewer refinery steps and/or better economics and/or improved properties of the diesel fuel obtained after the hydrotreatment step.

Specific Embodiments of the Invention

Below some specific embodiments of the present invention are further disclosed and explained. The specific embodiments relate to different options available for tailoring the tall diesel composition according to the present invention, which after a subsequent hydrotreatment step yields renewable diesel fuel, where the extent of utilization of different options is dependent on the initial tall oil composition.

The CTO contains substantial amounts of free- and bound fatty acids. The chemical structure of tall oil fatty acids typically comprises of 12 up to 26 carbon atoms (C12-C26, including the carbon atom holding the carboxylic group) arranged in linear fashion. Naturally, the tall oil fatty acids are molecules with even number of carbon atoms. However, during the harsh conditions under wood cooking process at pulp mills producing CTO as by-product, certain amount of artificial fatty acids containing odd number of carbon atoms are generated e.g. fatty acids comprised of C13, C15, C17, C19, C21 and C23 carbon atoms. Including these components in the tall diesel composition increases the total yield of the crude tall oil feedstock but at the same time provides a more balanced/extended tall diesel composition. Furthermore, these components are such consuming a comparatively low level of hydrogen gas in a subsequent hydrotreating step.

Furthermore, tall oil fatty acids contain from zero (saturated) to one or more double bonds (unsaturated), where for the unsaturated fatty acids with more than one double bond these can be conjugated and/or non-conjugated. For tall diesel composition purpose, the recovery of all free fatty acids is advantageous. According to one embodiment of the present invention, the tall diesel composition has a total fatty acid content in a range of 70-95 wt %. According to the present invention, the tall diesel composition comprises 1-20 wt % rosin acids, 6-35 wt % saturated fatty acids and 59-74 wt % unsaturated fatty acids.

Typically, when refining CTO, the saturated fatty acids are separated in the low value fractions and in some cases even discarded and/or burned as an internal fuel. For tall diesel composition purpose on the other hand, the presence of saturated fatty acids is advantageous as these substantially lower the hydrogen consumption in a subsequent hydrotreatment step of the tall diesel composition according to the present invention. In accordance with the present invention, including saturated fatty acids in the tall diesel composition at the defined level increases the total yield of the crude tall oil feedstock but at the same time provides a more balanced/extended tall diesel composition. Furthermore, as should be clear, these components are such consuming a comparatively low level of hydrogen gas in a subsequent hydrotreating step.

As an example, replacing 1 wt % of C18:1 fatty acid (Oleic acid having one double bond) with saturated counterpart C18:0 (Stearic acid) would decrease the hydrogen consumption ca 0.256%. In case that C18:0 replaces C18:2 (Linoleic acid) the decrease would be ca 0.261% and replacing C18:3 (Linolenic acid) the decrease of hydrogen consumption would be ca 0.266%. Thus, maximizing the recovery and incorporation of the saturated fatty acid fraction should be targeted for the preparation of an optimal tall diesel composition, such as the one according to the present invention, which alone would decrease hydrogen consumption up to 10%. Furthermore, incorporating all fatty acids i.e. fatty acids containing both even and odd carbon atoms in the tall diesel composition according to the present invention provides a more balanced/extended composition, which after a subsequent hydrotreating step more closely mimics the boiling point distribution of the fossil counterpart diesel fuel. Moreover, in relation to above it may also be said that preferred fatty acids are various isomers of C16-C18 fatty acids which indeed are the principal components of the tall oil fatty acid fraction. In a subsequent hydrotreatment step these components of the tall diesel composition form C15-C18 paraffins i.e. paraffins with the highest cetane numbers (cetane rating is an arbitrary scale relative to hexadecane paraffin with trivial name cetane, C16). Catalytic hydrotreatment step is applied on the tall diesel composition in order to remove all heteroatoms present such as O, N, S, etc. where oxygen dominates as comprising carboxylic, alcoholic and carbonyl functionalities found for components of the tall diesel composition. Thus, the catalytic hydrotreatment step subsequently applied on tall diesel composition obtained according to the present invention may be referred mainly as hydrodeoxygenation. Depending on the catalyst and conditions employed during a hydrotreatment step, the oxygen removal from for example a carboxylic group may yield paraffin with the same number of carbon atoms as the original fatty acid or paraffin with one carbon atom less compared to the original fatty acid. Thus, preferred fatty acid isomers C16-C18 after hydrothermal treatment yield slightly broader range paraffins C15-C18 and even broader range when all incorporated fatty acids are considered. Again, the most preferred C16-C18 fatty acids are the saturated, which provides for lower hydrogen consumption in the subsequent hydrotreatment step. As an example, for instance palmitic acid (C16) is preferably held in a range of 0-20 wt % and stearic acid (C18) in a range of 0-10 wt %. It has to be said that the upper limit of saturated fatty acids within the tall diesel composition according to the present invention are only due to the availability of these acids within the CTO rather than the limitation of the composition itself.

Lowering the hydrogen consumption contributes not only to improved economics but also provides a product with lower carbon footprint, an essential characteristic of renewable fuels (hydrogen consumption is part of the methodology used for the estimating the emissions of the respective fuel—Life Cycle Analysis, LCA). The hydrogen gas utilized during the hydrotreatment step has typically fossil origin as obtained either internally within refinery e.g. reforming or generated via steam reforming of natural gas. Thus, providing a tall diesel composition obtained according to the present invention containing significant content of saturated fatty acids yields renewable diesel fuel with improved carbon footprint as it contributes to lower the hydrogen consumption. Other specific embodiments described below for optimizing the tall diesel composition according to the present invention contribute further towards lowering the hydrogen consumption.

Moreover, also the rosin acid level within the tall diesel composition according to the present invention is of relevance. The set level in the tall diesel composition according to the present invention contributes to a final product after hydrotreatment which is similar to the fossil diesel fuel counterpart in terms of density. This is an advantage, and together with viscosity, lubricity etc. these parameters are provided at an efficient and strong level in a tall diesel composition according to the present invention. This is further exemplified below.

According to one specific embodiment of the present invention, the tall diesel composition comprises 15-20 wt % rosin acids. Rosin acids are the second most abundant component in tall oil. Structurally, the rosin acid isomers contain 20 carbon atoms arranged in three fused rings fashion and substituted with alkyl fragments. The functionality of rosin acids is governed by the presence of carboxyl group and 2 or 3 double bonds. Typically, when subjected to catalytic hydrotreatment, the rosin acids undergo hydrodeoxygenation, thus losing the carboxyl group and where double bonds are saturated yielding C19 naphthenes i.e. cyclic hydrocarbons, though certain amounts of aromatics are also generated. The ratio between naphthenes/aromatics is kept high through careful selection of the operating conditions and is well known within the art. The long alkyl naphthenes add beneficial properties for the obtained diesel fuel. These are characterized with high cetane numbers, have density of ca 0.9 g/cm3, bulky structure, viscosity higher than open structure alkane counterparts (C19), better lubricity, etc. The high cetane numbers provided by the long alkyl naphthenes could be comparable with the high cetane numbers obtained for linear paraffins originating from the fatty acids as discussed earlier. The slightly higher density of the naphthenes compensates for the luck of density from linear paraffins, on average 0.77 g/cm$^3$, which is a known drawback from the preparation of renewable diesel from vegetable oils, i.e. oils not containing rosin acids.

According to one specific embodiment of the present invention the optimal amount of rosin acids in the tall diesel composition is 15-20 wt %. After the hydrotreatment step on the tall diesel composition according to the present invention, this rosin acid level ensures that the obtained renewable diesel meets an optimal density specification, higher than 0.8 g/cm$^3$ (additional means for tuning the density according to the present invention are discussed below). Furthermore, the presence of bulky molecules in the final diesel product, such as naphthenes, disturbs and prevents stacking of the linear chain paraffins thus improving cold flow properties. Moreover, C19 naphthenes contribute to an increased viscosity which is an important parameter for the final diesel fuel where optimal viscosity provides adequate dosing of the fuel into the combustion chamber. C19 naphthenes may provide an improved lubricity of the final diesel fuel. Today, the requirement for almost complete removal of sulphur from the diesel fuel renders the fuel with very poor lubricity. Thus, providing sulphur-free components which improve lubricity, such as C19 naphthenes provided by the tall diesel composition according to the present invention, would be highly desirable.

According to yet another specific embodiment of the present invention, the tall diesel composition also comprises one or more hydrocarbons, alcohols, aldehydes, ketones, esters, ethers having a molecular weight in the range of 130-420 g/mole. This is beneficial according to the present invention. Typically, this group of components are referred to as neutrals (components not reacting with alkali). In conventional tall oil refineries these components are of lower interest and are accumulated in low value fractions. For the purpose of the present invention all of these components are of interest, thus providing further means for increasing the yield of tall diesel from CTO. The specified molecular weight range incorporates all components which after a hydrotreatment step fit into the diesel fuel boiling point specification of interest. Compared to a carboxylic acid fraction of the tall diesel composition according to the present invention neutral type of components have comparatively less oxygen atoms (one oxygen less per molecule), which is of interest in relation to a subsequent hydrotreatment step (at least one mol hydrogen per molecule is saved). Oxygen atom removal consumes hydrogen producing water as a by-product i.e. nothing directly valuable from a refinery point of view. Besides lowering the overall hydrogen consumption, the incorporation of neutrals components into the tall diesel composition according to the present invention provides balance within the boiling point distribution (smoothing out the curve) by filling the gaps between discrete paraffin components obtained from fatty acids. Furthermore, some of these components have cyclic structures thus acting in manner like naphthenes discussed earlier, i.e. disturbing the packing of linear paraffins at relatively low temperatures, hence improving the cold flow properties of the final diesel fuel.

According to one further embodiment of the present invention, the level of fatty alcohols in the tall diesel composition is maximum 3 wt % thus providing further means of increasing the yield of tall diesel composition. Although this is a relatively low level, the inclusion of these components also provides for higher yield and optimal product properties as mentioned above in the tall diesel composition according to the present invention.

Moreover, the principal components of fatty alcohols present in the tall oil are the linear C20, C22 and C24 alcohols. These are slightly on the high end of the boiling point curve but nevertheless interesting from a refinery point of view after a subsequent hydrotreatment step. Fatty alcohols consume less hydrogen compared to fatty acids both because they comprise one oxygen atom less per molecule and because the hydrocarbon tail of each molecule is saturated, i.e. no double bonds are present, hence no hydrogen consumption occurs for saturating this functionality. The slightly longer paraffin obtained from fatty alcohols can be corrected by standard isomerization treatment at the refinery, thus obtaining branched hydrocarbon without compromising on cetane number (normally, branching linear paraffins improves the cold flow properties at the expense of cetane number loss). In the case of fatty alcohols, as these are slightly longer, branching still produces hydrocarbons with cetane numbers comparable to C15-C18 hydrocarbons obtained from the principal fatty acids. The challenge for incorporating the fatty alcohols into the tall diesel composition according to the present invention is to preserve these in their free form. As being primary alcohols, these easily react with fatty acids forming high molecular weight ester, i.e. not available for isolation and incorporation within the tall diesel composition according to present invention. The formation of these esters, however, can be hindered/minimized by utilization of CTO pre-treatment and use of specific process equipment, practices well known within the art, thus keeping the fatty alcohols in their free form and susceptible for recovery and incorporation into the tall diesel composition according to the present invention. One example of a suitable pre-treatment approached is disclosed in WO 2014/098692.

According to yet another specific embodiment, the sum of various tall oil components with diterpenic structure other than rosin acids is in the range of 1-10 wt %. Also this links to the advantages mentioned above. This group of tall oil components (specific sub-group of CTO neutrals) includes partially oxidized diterpenes such as alcohols and aldehydes (precursors from biosynthesis of rosin acids) such as pimaral, pimaral, abietol, abietal, etc. or may contain hydrocarbons such as pimarane, abietane, etc. degradation products of rosin acids generated during wood cooking or tall oil handling. For tall diesel composition purpose, the recovery of all components within this group is advantageous. Since the backbone structure of diterpene components is the same as rosin acids it follows that these components, when incorporated to the tall diesel composition according to the present invention, would provide the same advantages for the diesel fuel obtained after a hydrotreatment step as discussed for rosin acids, e.g. high cetane numbers, have a density of around 0.9 g/cm$^3$, bulky structure, viscosity higher than open structure alkane counterparts (C19), better lubricity, etc. Furthermore, these diterpenes have an advantage over rosin acids as these consume less hydrogen (at least one oxygen atom les per molecule). Yet another advantage of incorporating the diterpenes in the tall diesel composition according to the present invention is the means for further increasing the yield from CTO. Moreover, the tall diesel composition according to the present invention can be further tailored by incorporation of all available diterpenes at the expense of rosin acids but still providing the density compensation (up to 20 wt. % naphthene equivalents) for the final diesel fuel after a hydrotreatment step. Thus, saved rosin acids are available for isolation and utilization in applications other than fuel e.g. precursor for chemical industry. Based on the above, according to one preferred embodiment of the present invention, the total level of diterpenic alcohols, aldehydes, abietanes and pimaranes is in the range of 1-10 wt %, preferably in the range of 2-10 wt %, more preferably in the range of 5-10 wt %.

According to yet another specific embodiment, the tall diesel composition according to the present invention has a total acid number in the range of 100-190 mg KOH/g, preferably in the range of 175-190 mg KOH/g. In this regard it may be mentioned that high acidity results in less hydrogen gas consumption as discussed above. The relatively high acidity is provided by the presence of various carboxylic acids specified within the other specific embodiments. Often renewable feedstocks such as vegetable oils and/or animal fats are processed to renewable diesel fuel, however these are either as glycerides or their respective alkyl esters such as methyl-, ethyl-, etc. esters. In contrast, when the tall diesel composition is processed in terms of hydrothermal treatment the carboxylic acid functionality is eliminated/transformed directly, thus avoiding any alkylation step, e.g. methylation, prior a hydrotreatment step, or avoiding the handling of any propane gas originating from the glycerol part of glycerides. Besides handling issues the presence of propane accounts for additional hydrogen gas consumption during the cleavage of fatty acid(s) from glycerol fragment where only this cleavage accounts for 3 moles hydrogen per 1 glyceride molecule.

The tall diesel composition according to the present invention also has other key properties. According to one embodiment, the tall diesel composition has a boiling point in the range of 155-420° C. at atmospheric pressure. This range allows for the incorporation of all tall oil components suitable for diesel fuel generation. Besides components discussed throughout the specific embodiments so far, some lighter terpenes (smallest being C10) may be incorporated into the tall diesel composition according to the present invention, thus providing further means for increasing the total yield from CTO. Many of these light terpenes are already hydrocarbons or have only one oxygen atom per molecule, thus consuming less or no hydrogen gas during the hydrotreatment step. The upper limit of boiling point distribution of a tall diesel composition according to the present invention is defined by the presence of certain amounts of triterpenes, e.g. squalene, hence tall oil components with higher boiling points are considered as tall oil pitch (TOP). Squalene is a C30 hydrocarbon with a boiling point at e.g. 458° C. In relation to the present invention, squalene may be used as a marker showing when a tall diesel composition according to the present invention is obtained. According to one embodiment of the present invention, the content of squalene in the tall diesel composition is in a range of 0.5-1.5 wt %. At levels around 1 wt %, the refined tall diesel cut during fractionation is balanced and well distributed according to the present invention.

Moreover, according to yet another embodiment, the total content of metal (Ca, Na, Mg, Fe, V, As, Si, Al, Ba, Cr, Cu, Mn, Ni, Pb, K, Zn) impurities is below 5 ppm. This is of relevance in terms of keeping catalyst poisons at a low level, again important for e.g. subsequent hydrotreatment.

The present invention also provides a process for the production of a tall diesel composition as described above. According to one embodiment there is provided a method for the production of a tall diesel composition according to the present invention, wherein the method comprises purifying a CTO (crude tall oil) to remove impurities and to produce a first refined tall oil stream;

separation of water and volatile components from the first refined tall oil stream by using evaporation, to produce a second refined tall oil stream;

separation of TOP (tall oil pitch) from the second refined tall oil stream, preferably in at least one TFE (thin film evaporator), more preferably in at least two TFEs in series, wherein the TOP is produced by condensation, and wherein there is also produced at least a third refined tall oil stream, substantially or totally free from TOP components;

optional further treatment of said at least third refined tall oil stream to produce the tall diesel composition said method comprising measuring the content of the marker squalene and perform optional further treatment of said at least third refined tall oil stream to ensure that the content of the marker squalene in the produced tall diesel composition is in a range of from 0.5-1.5 wt %.

Optional further treatment may according to the present invention involve different steps, suitably at least one fractionation and/or distillation step is involved. Furthermore, according to one embodiment the optional further treatment comprises distillation. Moreover, according to yet another embodiment, the further treatment involves further fractionation and removal of at least one fraction from said at least third refined tall oil stream to ensure that the content of the marker squalene in the produced tall diesel composition is in a range of 0.5-1.5 wt %. In relation to this embodiment, the fractionation may be performed in a fractionation/distillation tower and the removal or separation off of a suitable fraction may be performed during this step.

Moreover, and as hinted above, the tall diesel composition is suitably hydrotreated in a subsequent step. Therefore, according to one specific embodiment of the present invention, the third refined tall oil stream is deoxygenated in the presence of hydrogen gas.

EXAMPLE

A typical CTO with a composition exemplified in Table 1 was purified to remove various impurities, such as solids (salts, lignin, fibres, etc.), residual acid from CTO manufacturing, metals (various alkali-, alkali earth-, transition metals, etc.), water, etc. to obtain refined tall oil. Thereafter, the refined tall oil was released from occluded water, dissolved gases and light volatiles through processing in a thin-film evaporator to obtain a second refined oil stream. In the next step, the second refined oil was released from the fraction comprised of heavy tall oil components (high boiling points) to obtain a tall diesel composition according to one embodiment of the present invention and which is summarized in Table 1.

TABLE 1

Compositions of initial crude tall oil and tall diesel composition obtained according to the present invention.

| | CTO composition | Tall Diesel composition |
|---|---|---|
| Acid value, mg KOH/g | 139.3 | 177.1 |
| Fatty Acids, wt. % | 47.1 | 77.5 |
| Saturated, wt. % | 4.3 | 12.7 |

TABLE 1-continued

Compositions of initial crude tall oil and tall diesel composition obtained according to the present invention.

| | CTO composition | Tall Diesel composition |
|---|---|---|
| Unsaturated, wt. % | 42.8 | 64.8 |
| Rosin Acids, wt. % | 24.6 | 10.4 |
| Total carboxylic acids, wt. % | 71.7 | 87.9 |
| Neutrals, wt. % | 27.4 | 12.1 |
| Terpenes (mono-, di & tri-), wt. % | 6.4 | 4.9 |
| Di-terpenic (OH, C=O), wt. % | 3.5 | 6.7 |
| Fatty alcohols, wt. % | 1.5 | 0.5 |
| Water, wt. % | 1.0 | — |

The invention claimed is:

1. A tall diesel composition obtainable from a crude tall oil, said tall diesel composition comprising carboxylic acids in a range of 50-98 wt % and neutral components in a range of 2-50 wt %, wherein the tall diesel composition comprises 1-20 wt % rosin acids, 6-35 wt % saturated fatty acids and 59-74 wt % unsaturated fatty acids, and wherein the tall diesel composition also comprises one or more hydrocarbons, alcohols, aldehydes, ketones, esters, ethers having a molecular weight in the range of 130-420 g/mole.

2. The tall diesel composition according to claim 1, wherein the tall diesel composition has a total fatty acid content in a range of 70-95 wt %.

3. The tall diesel composition according to claim 1, wherein the tall diesel composition comprises 15-20 wt % rosin acids.

4. The tall diesel composition according to claim 1, wherein the level of fatty alcohols in the tall diesel composition is maximum 3 wt %.

5. The tall diesel composition according to claim 1, wherein the sum of various tall oil components with diterpenic structure other than rosin acids is in the range of 1-10 wt %.

6. The tall diesel composition according to claim 1, wherein the total level of diterpenic alcohols, aldehydes, abietanes and pimaranes is in the range of 1-10 wt %.

7. The tall diesel composition according to claim 1, wherein the tall diesel composition has a total acid number in the range of 100-190 mg KOH/g.

8. The tall diesel composition according to claim 1, wherein the tall diesel composition has a boiling point in the range of 155-420° C.

9. The tall diesel composition according to claim 1, wherein the total content of metal (Ca, Na, Mg, Fe, V, As, Si, Al, Ba, Cr, Cu, Mn, Ni, Pb, K, Zn) impurities is below 5 ppm.

10. The tall diesel composition according to claim 1, wherein the content of squalene in the tall diesel composition is in a range of 0.5-1.5 wt %.

11. A method for the production of a tall diesel composition according to claim 1, wherein the method comprises
purifying a CTO (crude tall oil) to remove impurities and to produce a first refined tall oil stream;
separation of water and volatile components from the first refined tall oil stream by using evaporation, to produce a second refined tall oil stream;
separation of TOP (tall oil pitch) from the second refined tall oil stream wherein the TOP is produced by condensation, and wherein there is also produced at least a third refined tall oil stream, substantially or totally free from TOP components;
optional further treatment of said at least third refined tall oil stream,
to produce the tall diesel composition
said method comprising measuring the content of the marker squalene and perform optional further treatment of said at least third refined tall oil stream to ensure that the content of the marker squalene in the produced tall diesel composition is in a range of 0.5-1.5 wt %.

12. The method according to claim 11, wherein the optional further treatment comprises distillation.

13. The method according to claim 11, wherein the further treatment involves further fractionation and removal of at least one fraction from said at least third refined tall oil stream to ensure that the content of the marker squalene in the produced tall diesel composition is in a range of 0.5-1.5 wt %.

14. The method according to claim 11, wherein the third refined tall oil stream is deoxygenated in the presence of hydrogen gas.

15. Method comprising using a tall diesel composition according to claim 1 for hydrotreating of the tall diesel composition over a catalyst in the presence of hydrogen gas.

16. The tall diesel composition according to claim 1, wherein the tall diesel composition comprises at least 10 wt % rosin acids.

17. The tall diesel composition according to claim 1, wherein the total level of diterpenic alcohols, aldehydes, abietanes and pimaranes is in the range of 2-10 wt %.

18. The tall diesel composition according to claim 1, wherein the total level of diterpenic alcohols, aldehydes, abietanes and pimaranes is in the range of 5-10 wt %.

19. The tall diesel composition according to claim 1, wherein the tall diesel composition has a total acid number in the range of 175-190 mg KOH/g.

20. The method according to claim 11, wherein the separation of TOP (tall oil pitch) from the second refined tall oil stream comprises at least one TFE (thin film evaporator).

21. The method according to claim 11, wherein the separation of TOP (tall oil pitch) from the second refined tall oil stream comprises at least two TFEs (thin film evaporators) in series.

* * * * *